May 16, 1967 W. L. LASSETTER 3,320,610
DETECTION, IDENTIFICATION AND COMMUNICATION SYSTEM
Filed Sept. 9, 1965 2 Sheets-Sheet 1

INVENTOR.
WILLIAM L. LASSETTER
BY
John H. Gallagher
ATTORNEY

May 16, 1967 W. L. LASSETTER 3,320,610

DETECTION, IDENTIFICATION AND COMMUNICATION SYSTEM

Filed Sept. 9, 1965 2 Sheets-Sheet 2

INVENTOR.
WILLIAM L. LASSETTER
BY
John H. Gallagher
ATTORNEY

3,320,610
DETECTION, IDENTIFICATION AND COMMUNICATION SYSTEM

William L. Lassetter, Charlottesville, Va., assignor to Sperry Rand Corporation, a corporation of Delaware
Filed Sept. 9, 1965, Ser. No. 486,063
8 Claims. (Cl. 343—6)

This invention relates to a communication system that provides means for the mutual detection and identification of two communicants at their respective locations and further provides a communication link therebetween. This system is ideally suited for controlling marine traffic in a harbor, for example, and the system is realized by integrating existing radar and radio systems into a complete intelligence system.

Radio aids to navigation are playing an increasing role in the coordination of vehicular traffic. In the control of harbor traffic, for example, relatively widespread use presently is being made of conventional search radar equipment as well as standard radiotelephone communication systems. Harbor surveillance radars provide a continuous over-all view of ship movements, and radiotelephone communication equipment permits direct voice communication between the maneuvering vessels and a harbor traffic coordinator, for example. It is recognized, however, that conventional radar and voice communication systems by themselves leave much to be desired toward the attainment of efficient monitoring and control of the traffic in a crowded harbor. As one example, a problem is routinely encountered in communicating specific navigation instructions to a preselected vessel. In this case, it is desirable that the navigation message be selectively communicated to the chosen vessel in such a manner as to minimize the possibility of confusion. It also is desirable that the harbor traffic coordinator be able to identify with certainty the origin of inquiries and other messages being received from a vessel within the harbor. Lastly, it is important that such selected communication be accomplished with a minimum of equipment in addition to the existing radar and radio equipment now carried by almost all ships.

It therefore is an object of this invention to provide an electromagnetic wave radiating system which permits the mutual detection and identification of two communicants and additionally provides a communicating channel therebetween.

It is another object of this invention to provide a ship's communication system which permits the establishment of an exclusive communication link between two respective stations with a minimum of interference to other radiating and/or receiving stations in the vicinity.

Another object of this invention is to provide means for integrating a ship's radar and radio system into a complete intelligence system which permits the mutual detection and identification of two stations and additionally provides an intelligence conveying radio link therebetween.

Another object of this invention is to provide means for a calling station to alert a preselected distant station with whom communication is desired, and additionally provides means for permitting the desired station to identify the location of the calling station, and all other stations in the area either not being alerted or being informed of the identity of the two communicants.

These and other objects and advantages of the present invention, as will appear from a reading of the following specification, are accomplished by the provision of auxiliary electronic equipment which cooperates with conventional shipboard search radar and radio communication equipment to establish a selective communication link between two stations, it being assumed that both the stations have similar radar and radio equipment. The independent use of the respective radar and radio systems to perform their customary functions is not impaired. At the calling station, pulses are derived from the continuously scanning radar antenna beam of the desired station to be contacted, the pulses being derived only during short intervals of time as the called station's radar beam sweeps past the calling station. The derived pulses actuate auxiliary apparatus at the calling station to produce a sinusoidal waveform having zero crossover points which occur concurrently with the derived pulses. The sinusoidal waveform is delayed in phase by an amount corresponding to the round trip propagation time of electromagnetic waves propagating between the two stations. The delayed sinusoidal waveform modulates the carrier wave of the calling station's radio transmitter and this modulated carrier wave is radiated toward the selected called station whose position is known from the calling station's own radar. Because of the delay introduced into the sinusoidal waveform, the modulation envelope of the calling station's carrier wave will arrive at the called station with its zero crossover points coincident in time with the called station's presently generated radar triggers. The coincidence of signals at the called station is detected, a visible and/or audible alarm is actuated, and an extra intensified display is presented at the center of the P.P.I. scope of the called station's radar, thus alerting the called station that is being called. The equipment at the calling station then automatically operates to eliminate the phase shift from its derived sinusoidal waveform so that its modulated carrier now arrives at the called station with its zero crossover points coincident in time with the called station's radar echo pulses that are reflected from the calling station. This second coincidence of signals is detected at the called station and is displayed as an extra intensified spot on its radar scope at a position representing the location of the calling station relative to the called station. The called station now knows that it is being called and also knows the position of the calling station so that it now may initiate conventional radio communications with the calling station Other non-selected radio stations that may be in the vicinity of the two communicating stations will be either completely non-responsive to the signals of the two communicating stations because of the lack of coincidence of the actuating signals, or the intensified spots displayed on their radar scopes will identify both the calling and called stations, thereby informing the non-selected stations that they are not to be included in the desired communication.

The invention will be described by referring to the accompanying drawings in which.

Figure 1:
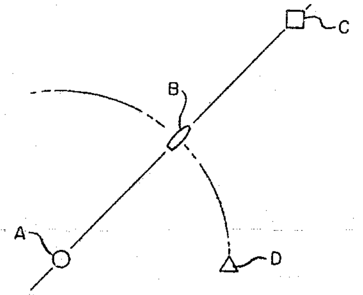
FIG. 1 is a sketch illustrating the relative positions of the calling and called stations, and other stations in the vicinity that are not to be included in a desired communication link.

Referring now in detail to FIG. 1, station A represents the calling station and station B represents the called station. Station C is located along the same azimuth direction as station B but is at a different range from the calling station A. Station D is at the same range as station B but is at a different azimuth position. It is desired to establish exclusive communication between stations A and B and it is further required that all stations be able to determine the identity of the two desired communicants. It may be assumed that the calling station A is a harbor controller station charged with the responsibility of controlling traffic in a harbor, and that the called station B is a ship in the harbor which the controller wishes to contact regarding its course of travel or position, for example. It further may be assumed that all stations have operating ratio communication equipment and radar equipment, and that the radar equipment on the ships B, C and D includes antennas that continuously scan through 360° in azimuth, as is conventional in marine radars. The calling station A will know the position of the desired call station B either from direct visual observation or from the displayed information on the P.P.I scope of its own radar.

Figure 2:
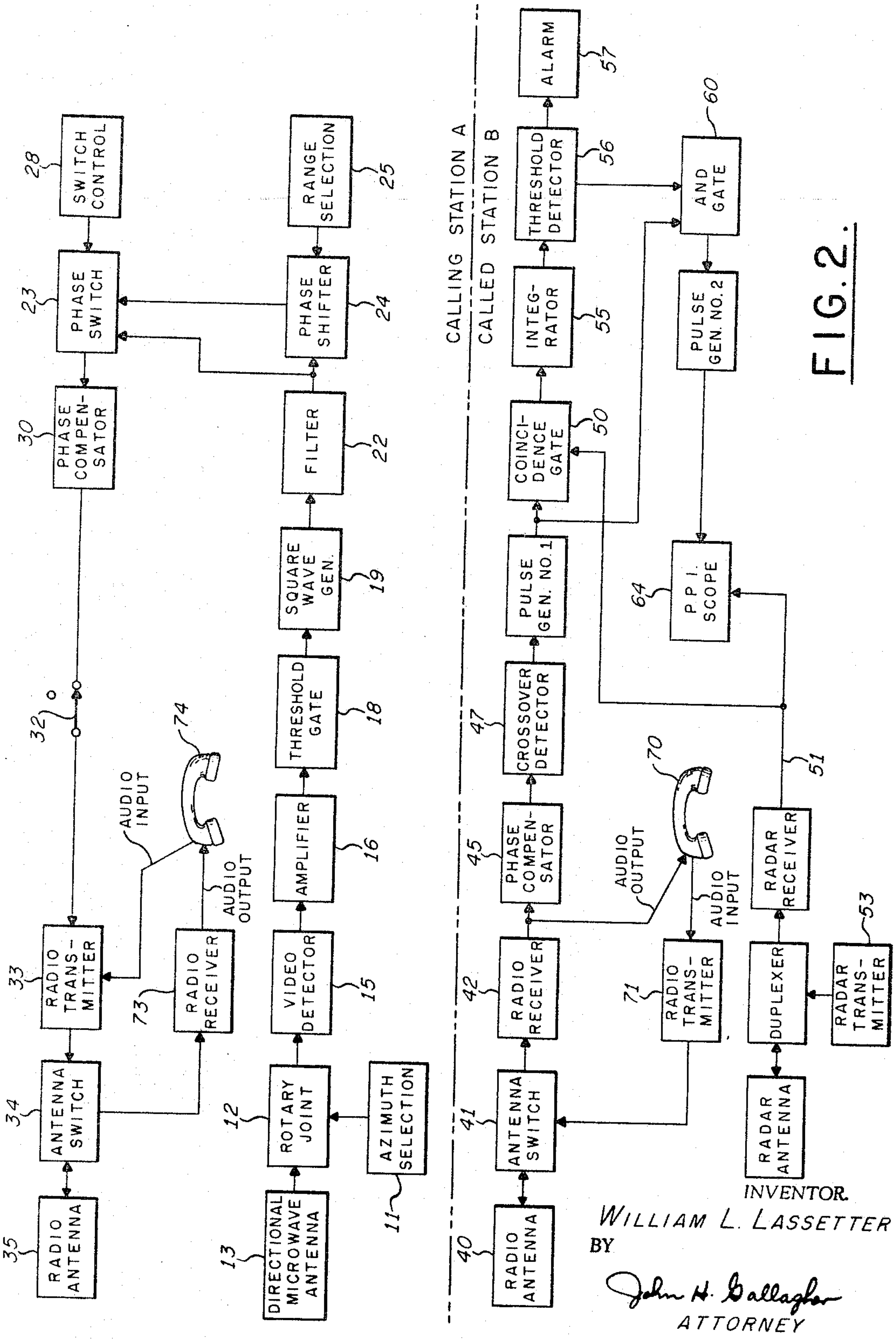
FIG. 2 is a block diagram of the operating portions of the equipment at the calling and called stations between which the communication link is to be established.

In practice, the called and calling stations and the non-selected stations each may include all of the equipment represented in the block diagram of FIG. 2, but for simplicity of illustration and description of the invention, the equipment represented in FIG. 2 will be divided between the calling and called stations in a manner convenient to describe the typical operation of the system.

After having determined the position of the station to be called, the calling station actuates its azimuth selection mechanism 11 which operates through the rotary joint 12 to direct its directional microwave antenna 13 toward the called station. As the called station's radar antenna beam sweeps past the calling station, the directional microwave antenna 13 will pick up the radar pulses from the called station and these pulses will be detected in video detector 15 and will be amplified in the amplifier 16. A threshold gate 18 is set to pass the detected radar pulses from the calling station but will not pass lower level noise and spurious signals. The passed radar pulses trigger square wave generator 19 which may be a bistable multivibrator that produces a square wave output at a repetition frequency of one half the repetition frequency of the radar pulses from the called station. The square wave output from generator 19 then is passed through filter 22 which is a low pass filter that derives substantially only the fundamental sine wave component from the square wave input. This sine wave output is coupled directly to a phase switch 23, and also is passed through phase shifter 24 and then to phase switch 23. The amount of phase shift introduced by phase shifter 24 is selectable by range selection means 25. The phase shift introduced by phase shifter 24 must advance the phase of the sine wave by an electrical angle $\theta$ that is equal in magnitude to the phase delay experienced by the called station's radar pulses in propagating a round trip between the called and calling stations. The round trip propagation time of the radar pulses is a known value for a known range between the two stations, and this range may be determined from the calling station's radar. In converting this known time delay to phase advance of the sine wave, however, it will be noticed that the magnitude of the phase advance in electrical degrees is not only a function of the range, but also a function of the frequency of the sine wave, which in turn is a function of the called station's pulse repetition frequency $f_{(\text{called})}$. Therefore, phase shifter 24 must have a linear phase shift versus frequency characteristic in order to correct for changes in the pulse repetition frequency of the called station's signal. The design of circuits for accomplishing this result is straightforward. A simple filter network, for instance, in the form of a series resistor (R) followed by an inductance (L) shunted to ground may be used for the shifter 24 is in the assumed environment. Since the ranges encountered in such an environment will be relatively small, the radiated signal propagation time will be relatively short resulting in small values for the angle $\theta$. To a close approximation, then, this R–L circuit will have a characteristic in which $$\theta=\left(\frac{L}{R}\right)f_{(\text{called})}$$

Phase switch 23 operates in response to the signal from switch control means 28 to alternately pass the phase shifted sine wave and the non-phase shifted sine wave. The switching rate of phase switch 23 need not necessarily be synchronized with any other portion of the operating system but for convenience it may switch at a rate equal to a representative scanning rate of a marine radar antenna. Therefore, during one sweep of the called station antenna beam past the calling station a phase shifted sine wave will be passed by phase switch 23, and on the next succeeding sweep the phase switch 23 will pass a non-phase shifted sine wave. The mode of operation in which phase switch 23 passes phase shifted sine waves will be referred to hereinafter as mode 1, and the mode of operation in which phase switch 23 passes the non-phase shifted sine waves will be referred to as mode 2.

Assuming for the present that the system is operating in mode 1, the sine wave output from phase switch 23 is passed through phase compensator 30 which is a network having a phase characteristic just opposite to the collective phase shift characteristics of the remainder of the above-described circuitry of calling station A, excluding phase shifter 24. That is, if the remainder of the circuitry of calling station A has a frequency characteristic that may be expressed by the Fourier transform $F_T(W)$, then the phase compensator 30 is made to have a frequency characteristic that may be expressed by the Fourier transform $F_T^{-1}(W)$. The result is that the phase compensator 30 cancels out any undesired phase errors introduced to the called station's radar pulses and the derived sine wave by the calling station equipment. In practice, phase compensator 30 may be a filter network which may be designed in accordance with known techniques to possess the desired characteristics. The phase compensated sine wave from phase compensator 30 then passes through the closed switch 32 and modulates the carrier wave of the radio transmitter 33. The modulated carrier wave then passes through antenna switch 34 and is radiated by the omnidirectional radio antenna 35.

The sine wave modulated carrier wave from radio antenna 35 is received at the omnidirectional radio antenna 40 of the selected called station, passes through antenna switch 41, and is detected in radio receiver 42. The output sine wave from radio receiver 42 then is passed through a phase compensator 45 which is the same type of circuit as phase compensator 30 described above, but which is designed to have a phase characteristic to compensate for any phasing error that may be introduced by radio receiver 42. The compensated sine wave in the called station equipment then is coupled to crossover detector 47 which operates to produce short-duration output pulses at predetermined reference points such as the 0° and 180° points of the sine wave. Suitable crossover detectors are known in the art, one example being the one shown in FIG. 6 of U.S. Patent 3,034,053, issued May 8, 1962, in the names of Walter C. Lanning and Robert E. Spero. The output pulses from crossover detector 47 are shaped and amplified in pulse generator No. 1 and are coupled as one input to coincidence gate 50. The second input to coincidence gate 50 is coupled over line 51 and is comprised of pulses that are derived from the presently generated radar triggers from radar transmitter 53 of the called station. These radar triggers may be derived from the detected spill-over pulses of the called station's presently generated radar triggers.

Figure 3:
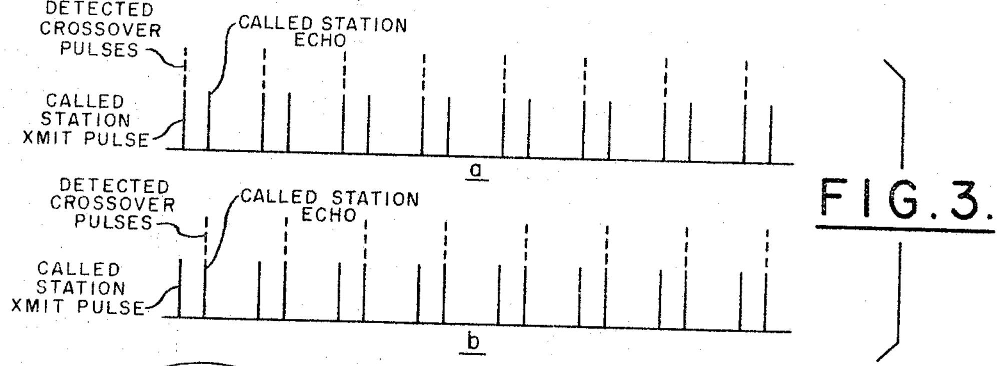
FIG. 3 is a series of waveforms used in explaining the operation of the system illustrated in FIG. 2.

Because the derived sine wave in the calling station was advanced in phase by an amount equal to the phase delay experienced by electromagnetic waves propagating their round trip between the calling and called stations, thus effectively wiping out this range information, the output pulses from pulse generator No. 1 will arrive at coincident gate 50 in time coincidence with the presently generated radar triggers of the called station when the phase switch 23 of the calling station is operating in mode 1 as defined above. This time coincidence is illustrated in FIG. 3*a*. The triggers passed by coincidence gate 50 are coupled to integrator 55 which operates in response to continuous input triggers to build up a D.C. output signal above some predetermined threshold level. The output signal from integrator 55 is passed by threshold detector 56 and actuates an audible or visible alarm 57 to notify the called station that it is being called.

Figure 4:
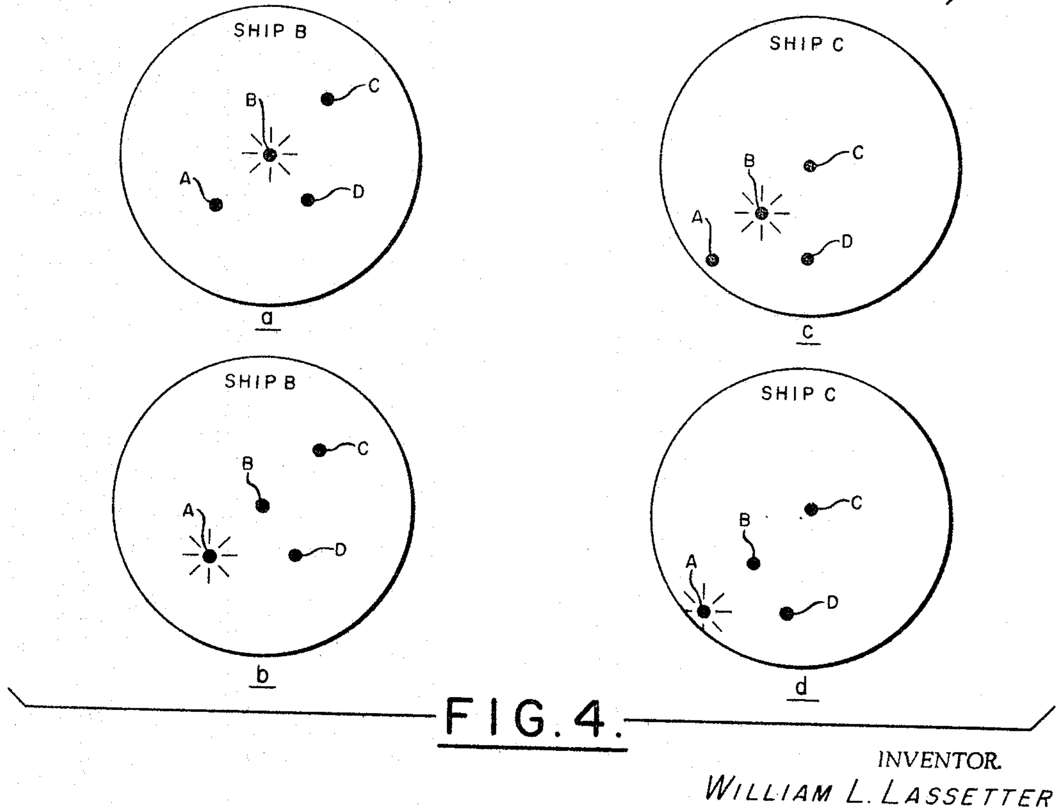
FIG. 4 is a series of sketches illustrating the type of P.P.I. radar scope displays that will be presented at various stations depicted in FIG. 1.

The output of threshold detector 56 and the output of pulse generator No. 1 both are coupled to AND gate 60 which operates in response to the presence of both input signals to pass the crossover pulses from pulse generator No. 1 to a second shaping and amplifying pulse generator No. 2. The output pulses from pulse generator No. 2, along with the presently generated radar triggers on line 51, both are coupled to P.P.I. scope 64 of the called station's radar. These two inputs to P.P.I. scope 64 will be coincident in time and will present an extra intensified spot at the center of the called station's P.P.I. scope, as illustrated in FIG. 4*a*. By this intensified spot at the center of its radar scope, a second means is provided for informing called station B that it is being called.

Consider now the operation of the system in mode 2 in which phase switch 23 of the calling station passes the non-phase shifted sine wave from filter 22. This sine wave will modulate the carrier wave of radio transmitter 33 and after radiation from radio antenna 35 of the calling station will be received and detected at the called station in the same manner as described for operation in mode 1. A difference arises in the operation under the two modes and this difference may be recognized by considering the time relationships of the input signals to coincidence gate 50. Because the sine wave is not advanced in phase in the calling station during operation in mode 2, and since the sine wave was derived from the called station's radar pulses as received at the calling station, the crossover pulses derived from the sine wave modulated radio carrier wave received at antenna 40 of the called station are in time coincidence with the called station's radar echo that is reflected from the calling station, as illustrated in FIG. 3*b*. This coincidence of the radio and radar signals is detected in coincidence gate 50 of the called station and the output pulses therefrom are integrated in integrator 55, and the integrated signals, which are at a D.C. level, pass the threshold level detector 56 and actuate the alarm 57. The integrated signal also is coupled to AND gate 60 which is thereby enabled to pass the pulses from pulse generator No. 1. After reshaping in pulse generator No. 2 the pulses are applied to P.P.I. scope 64 in time coincidence with the called station's radar echoes from the calling station to thereby produce a spot of extra intensity at a position representing the location of the calling station A, see FIG. 4*b*. The called station now knows the position of the calling station and may respond on its radiotelephone handset 70 whose audio signal modulates the radio transmitter 71 to produce a voice-modulated radio wave that is radiated from radio antenna 40. The voice-modulated carrier from the called station is received at the calling station omnidirectional radio antenna 35, is coupled through switch 34 to the radio receiver 73 which demodulates the signal and provides the voice-modulated audio input to handset 74. Voice communication now having been established between the two desired communicants, the calling station may open the switch 32 to eliminate the derived sine wave from the established communication link.

Considering now the response at the non-selected stations, and taking station D first, there will be no alarm signal on the alarm 57 at station D and there will be no extra intensification of radar targets on its P.P.I. scope because the calling station's directional microwave antenna 13 will be pointed along a different azimuth angle and either will not pick up radar pulses from station D, or if they are picked up, they will be of such low magnitude that they will not pass the threshold gate 18 of the calling station. Therefore, non-selected station D will not be aware that calling station A is desiring to establish communications with the called station B.

As to station C, which is on the same azimuth angle as the desired called station B, as station C's radar antenna beam scans past the calling station A, the directional microwave antenna 13 at station A will pick up station C's radar pulses and the will be processed in the same manner as previously described, it being remembered that the phase advance that is introduced by phase shifter 24 still is set by range selection means 25 to introduce a phase advance to effectively wipe out the range between stations A and B. In the operating mode 1, a sine wave will be derived from station C's radar pulses and the sine wave will be advanced in phase by an electrical angle to effectively wipe out the phase delay experienced by electromagnetic waves propagating a round trip distance from station B to station A. After this sine wave modulates the radio transmitter the sine wave modulated carrier is radiated by radio antenna 35 back toward station C. However, because of the phase advance introduced by calling station phase shifter 24, the modulated radio wave will arrive at station C with the zero crossovers of the sine wave occurring at times that represent the delay experienced by waves propagating the round trip distance only between stations C and B. These crossovers therefore will be in time coincidence with station C's own radar echo pulses that are reflected from station B. This coincidence will be detected in station C's coincident gate 50 and will be processed in the same manner as previously described to actuate alarm 57 and to present an extra intensified target display at the position of station B, as illustrated in FIG. 4*c*. Station C therefore knows that station B is one of the desired communicants.

In operating mode 2, during which the sine wave in the calilng station is not phase shifted, the sine wave modulated carrier is radiated by the calling station's antenna 35 and will return to station C in time coincidence with station C's radar echoes that are reflected from station A. These signals will be detected and displayed on the P.P.I. scope at station C in the same manner as described above in connection with mode 2 operation of the called station B, and as a consequence, an extra intensification will appear on the P.P.I. scope of station C at a position representing the location of the calling station A, as illustrated in FIG. 4*d*. The operator at station C now knows the identity of both communicating stations and is aware that he is not to be included in the communication link to be established.

It will be apparent that any of the stations that possess all the equipment represented by the blocks in FIG. 2 may initiate a call in the manner described above for station A. On the other hand, if it is determined that a ship will not need to initiate a call of the type described, but need only be prepared to accept such a call, then the ship will not have to carry the equipment represented by the blocks whose numeral designations fall within numbers 11–32 as represented in FIG. 2.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A position-selective calling and identification system including two separated stations, a radar at one of said stations for producing a succession of radar pulses at a certain repetition frequency, means at the other of said stations for receiving said radar pulses, means at said other station responsive to said radar pulses for producing a modulation waveform having a frequency that is a function of the repetition frequency of said radar pulses, means at said other station for advancing the phase of reference points of said modulation waveform by an amount corresponding to the phase delay experienced by radar pulses in propagating a round trip between said stations, means at said other station coupled to receive both the phase shifted and the non-phase shifted modulation waveforms and operable to alternately pass said two different waveforms, means at said other station for radiating a radio signal alternately modulated by said modulating waveforms, means at said one station for receiving said modulated radio signal and for producing reference signals concurrently with the occurrence of said predetermined reference points of the modulation waveform, means at said one station for providing radar-derived signals in response to received echo radar pulses and from presently generated radar triggers of said one station, means for determining coincidence between said reference signals and said radar-derived signals, and means for providing an indication when the above-named coincidence occurs.

2. A position-selective calling and identification system including two separated stations, a radar at one of said stations for producing a succession of radar pulses at a certain repetition frequency, directional antenna means at the other of said stations for receiving said radar pulses, means at said other station responsive to said radar pulses for producing a modulation waveform having a frequency that is a function of the repetition frequency of said radar pulses, means at said other station for advancing the phase of reference points of said modulation waveform by an amount corresponding to the phase delay experienced by radar pulses in propagating a round trip between said stations, switching means at said other station coupled to receive both the phase shifted and the non-phase shifted modulation waveforms and operable to alternately pass said two different waveforms, means at said other station responsive to the output of said switching means for radiating a radio signal modulated by said modulating waveforms, means at said one station for receiving said modulated radio signal and for producing reference signals concurrently with the occurrence of said predetermined reference points of the modulation waveform, coincidence means at said one station having a first input for receiving said reference signals and having a second input for receiving presently generated radar triggers from said one station and radar echo pulses from its radar, indicator means operable in response to the output of said coincidence means for producing an indication of coincidence of signals applied to said coincidence means.

3. The combination claimed in claim 2 wherein said means for producing a modulation waveform is comprised of means for deriving a sine wave at a frequency of one-half the pulse repetition frequency of said radar pulses and wherein, said reference points on said modulation waveform are the 0° and 180° crossover points of said sine wave.

4. The combination claimed in claim 2 and further including respective phase compensating means at both of said stations for cancelling any unintended phasing errors introduced at the respective stations.

5. A position-selective calling and identification system including two separated stations, a search radar at one of said stations for producing a succession of radar pulses at a certain repetition frequency, directional antenna means at the other of said stations for receiving said radar pulses, means at said other station responsive to said radar pulses for producing a sine wave having a frequency that is a function of the repetition frequency of said radar pulses, means at said other station for advancing the phase of said sine wave by an amount corresponding to the phase delay experienced by radar pulses in propagating a round trip between said stations, switching means at said other station coupled to receive both the phase shifted sine wave and the non-phase shifted sine wave and operable to alternately pass said two difference sine waves, radio transmitting and radiating means at said other station coupled to receive the output of said switching means and operating to radiate a sine wave modulated radio signal, means at said one station for receiving and detecting said modulated radio signal and for producing reference pulses at predetermined reference points of a detected sine wave, coincidence means having a first input for receiving said reference pulses and having a second input for receiving presently generated radar triggers from said one station and radar echo pulses from its search radar, indicator means operable in response to the output of said coincidence means for providing an indication of coincidence of signals applied to said coincidence means.

6. The combination claimed in claim 5 wherein said indicator means includes the indicator of said one station's search radar.

7. The combination claimed in claim 5 and further including integrator means coupled to the output of said coincidence means for providing a D.C. signal upon the occurrence of successively occurring output pulses from said coincidence means, said indicator means including an alarm operable in response to a D.C. signal from said integrator means.

8. The combination claimed in claim 7 and further including an AND gate coupled to receive said D.C. signal from said integrator and said reference pulses and operating to produce output pulses upon the simultaneous occurrence of the two input signals thereto, and a radar scope coupled to receive both the output of said AND gate and a conventional radar output signal derived from said one station's radar.

No references cited.

RODNEY D. BENNETT, *Primary Examiner.*

CHESTER L. JUSTUS, *Examiner.*

D. C. KAUFMAN, *Assistant Examiner.*